United States Patent
Liao (10) Patent No.: US 9,585,123 B2
(45) Date of Patent: *Feb. 28, 2017

(54) USER EQUIPMENT, BASE STATION, AND MTC-IWF FOR IMPLEMENTING GROUP BASED MTC MESSAGING THROUGH CELL BROADCAST

(71) Applicant: HTC Corporation, Taoyuan (TW)

(72) Inventor: Ching-Yu Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,932

(22) Filed: Jun. 14, 2015

(65) Prior Publication Data
US 2015/0282120 A1    Oct. 1, 2015

Related U.S. Application Data

(63) Continuation of application No. 13/933,137, filed on Jul. 2, 2013, now Pat. No. 9,094,779.
(Continued)

(51) Int. Cl.
*H04W 4/00*    (2009.01)
*H04W 72/00*   (2009.01)
(Continued)

(52) U.S. Cl.
CPC ......... *H04W 72/005* (2013.01); *H04W 4/005* (2013.01); *H04W 4/06* (2013.01); *H04W 48/10* (2013.01); *H04W 68/025* (2013.01); *H04W 4/08* (2013.01); *H04W 48/12* (2013.01); *H04W 48/16* (2013.01)

(58) Field of Classification Search
CPC ..... H04W 4/005; H04W 48/12; H04W 48/16; H04W 4/06; H04W 72/005; H04W 4/08; H04W 48/10; H04W 68/025
See application file for complete search history.

(56) References Cited

U.S. PATENT DOCUMENTS

2011/0244907 A1* 10/2011 Golaup ............... H04W 4/005
                                                455/509
2012/0004003 A1*  1/2012 Shaheen ............. H04W 4/005
                                                455/509
(Continued)

FOREIGN PATENT DOCUMENTS

CN    102238476    11/2011
CN    102238477    11/2011
(Continued)

OTHER PUBLICATIONS

"Office Action of Taiwan Counterpart Application", issued on Mar. 12, 2015, p. 1-p. 8.
"Office Action of China Counterpart Application", issued on Jan. 4, 2016, p. 1-p. 8.

*Primary Examiner* — Ajit Patel
(74) *Attorney, Agent, or Firm* — Jianq Chyun IP Office (57) ABSTRACT

The present disclosure proposes a UE, a base station, and a MTC-IWF for implementing MTC group trigger messages through a Cell Broadcasting Service (CBS). The method includes a MTC (Machine Type Communication) server transmitting to a MTC Inter-working Function (MTC-IWF) a trigger payload. The trigger payload would be delivered by the MTC-IWF to a group of MTC devices through Cell Broadcasting Center (CBC) and network nodes. The trigger payload may include a group trigger message indicator which distinguishes the group trigger message from a normal warning message. In response to receiving the content of the trigger payload, the network would page a group of MTC devices. From the group trigger message indicator embedded in the paging message, each MTC device would be able to receive a group trigger message through new system information block of the broadcast information.

13 Claims, 8 Drawing Sheets

Related U.S. Application Data

(60) Provisional application No. 61/667,433, filed on Jul. 3, 2012.

(51) Int. Cl.
*H04W 68/02* (2009.01)
*H04W 4/06* (2009.01)
*H04W 48/10* (2009.01)
H04W 48/12 (2009.01)
H04W 48/16 (2009.01)
H04W 4/08 (2009.01)

(56) References Cited

U.S. PATENT DOCUMENTS

| | | | | |
|---|---|---|---|---|
| 2013/0115977 A1* | 5/2013 | Chandramouli | ...... | H04W 68/00 455/458 |
| 2013/0225169 A1* | 8/2013 | Farnsworth | ...... | H04W 60/04 455/436 |
| 2014/0128029 A1* | 5/2014 | Fong | ...... | H04W 48/12 455/411 |
| 2015/0256959 A1* | 9/2015 | Jain | ...... | H04W 56/00 370/312 |

FOREIGN PATENT DOCUMENTS

| EP | 2369883 | 9/2011 |
|---|---|---|
| TW | 201204107 | 1/2012 |
| WO | 2011134394 | 11/2011 |

\* cited by examiner

USER EQUIPMENT, BASE STATION, AND MTC-IWF FOR IMPLEMENTING GROUP BASED MTC MESSAGING THROUGH CELL BROADCAST

CROSS-REFERENCE TO RELATED APPLICATION

This application is a continuation application of and claims the priority benefit of a prior application Ser. No. 13/933,137, filed on Jul. 2, 2013, now allowed. The prior application Ser. No. 13/933,137 claims the priority benefit of U.S. provisional application Ser. No. 61/667,433, filed on Jul. 3, 2012. The entirety of each of the above-mentioned patent applications is hereby incorporated by reference herein and made a part of this specification.

TECHNICAL FIELD

The present disclosure generally relates to a user equipment (UE), a base station, and a Machine Type Communication Interworking Function (MTC-IWF) for implementing group based MTC device triggering through cell broadcasting messages.

RELATED ART

Machine type communication (MTC) is a form of data communication which involves one or more entities that do not necessarily require human interventions. A MTC device could be a user equipment equipped for MTC or a device deployed with MTC applications and may communicate through a Home Public Land Mobile Network (HPLMN) such as a mobile network of a service provider with MTC servers or other MTC devices. Examples of MTC applications could include and not limited to a user equipment (UE) such as a mobile handset equipped with MTC applications or functions, a vehicular device which may include speedometer, odometer, anti-theft devices, road side monitors, and personal health care devices which may include blood pressure sensor, blood sugar sensor, pace maker, and homeland security monitors which may include earthquake detectors, landslide detectors, and smart meters.

As the MTC form of communication has become one of the imminent developments of the communication industry, group based MTC communication has been one of the topics discussed by the specification setting organizations such as ESTI and 3GPP. Since the quantity of MTC devices is expected to far exceed the quantity of typical handheld mobile devices, the large volumes of communication traffic transmitting back and forth between networks and MTC services could impose a serious burden on any communication network if left uncontrolled. In order to streamline MTC communications by reducing the volume of control and data traffic as well as to enhance MTC manageability, resorting to group based MTC control is an efficient and unavoidable trend in the communication industry. MTC devices could typically be grouped based on common features such as common functions or locations, and group based MTC communications would effectively reduce the amount of traffic and allow a MTC application server to interact with large quantities of MTC apparatuses.

Within the area of group based MTC communications, a more specific topic which has been discussed is the handling of group based MTC device messages in the HPLMN, or more specifically the handling of group based MTC messaging in between a MTC server and a MTC device within a network. For just an individual device trigger message per se, it has been proposed to solve issues related to MTC device trigger in the HPLMN through a control plane Device Trigger Gateway (DT-GW) which would be implemented as a functional entity within the MTC inter-working function (MTC-IWF), and thus the DT-GW function within MTC-IWF is referred to as the Device Trigger (DT) function. A device trigger message could be transmitted from a MTC server over the Tsp reference point to the HPLMN. After the device trigger message is received and processed by the MTC-IWF within the HPLMN, the device trigger message would be delivered to a MTC device by the HPLMN. 3GPP TR 23.888 v11.6.1 ("Reference [1]" hereinafter) describes in detail the handling of device triggers within HPLMN and the delivery of device trigger from the HPLMN to a UE as well as functional definitions of the DT function and is therefore incorporated by reference for all purposes.

For example, in the case of the Long Term Evolution (LTE) System, when a MTC server wants to communication with a MTC device but lacks sufficient information to be able to send data packets to the MTC device or when the MTC device has gone into hibernation or has timed out, the MTC server may send a device trigger request with an identity of the MTC device to the MTC-IWF in order to test or recover the connectivity with the MTC device. Upon receiving the device trigger request, the MTC-IWF would attempt to receive authorization of the device trigger request from a Home Subscriber Service (HSS) using at least the identify of the MTC device. After receiving authorization of the trigger request, the MTC-IWF may deliver a trigger message to a Serving General Packet Radio Services Support Node (SGSN) or Mobility Management Entity (MME) in order for the trigger message to be delivered to the MTC device through a paging message. The delivery of the trigger message from the MTC-IWF to the SGSN or MME could be through a variety of different mediums as described in section 6.45.4~6.45.5 of reference [1].

However, there has not been a common consensus as to how to effectively implement a group based MTC message. Conventionally, if an application server were to send a message to a group of MTC devices, the application would have to send separate messages to each of the group of TMC devices.

To implement the group based MTC messaging, one inclination of the communication industry is to implement such measure by modifying existing infrastructures. One suggestion is to utilize group based MTC messaging the existing medium of a Cell Broadcasting Service (CBS) which utilizes a Cell Broadcast Center (CBC) within the network architecture to enable a broadcast message to be delivered to a group of MTC devices. However, using the CBS to deliver device trigger messages would not be without difficulties since different networks implement cell broadcasts differently. The network architectures and the subsequent CBS delivery procedures of Global System for Mobile communications (GSM), Universal Mobile Telecommunications System (UMTS), and Evolved Packet System (EPS) are all different as described in 3GPP TS 23.041 v11.2.0 ("Reference [2]" hereinafter), particularly in sections 3.1~3.3. Reference [2] is hereby incorporated by reference for all purposes.

For example, in LTE the MTC-IWF has incorporated the functionalities of a Cell Broadcast Entity (CBE) which acts as one or more interfaces between a CBC and a Mobile Network Operator (MNO), and the CBE would typically provide functions related to formatting, control, and definition of the CBS messages. After a MTC server delivers a message to the MTC-IWF, the CBE may format the message in order for the message to be comprehensible for the CBC. The CBC would then deliver the device trigger message to a MME in order to be delivered to a chosen number of base stations or eNBs, and then base stations would be able to deliver the message to MTC devices through paging messages. However, since different network architectures handles the CBS differently, the operations required by the MTC-IWF would be increasing complex.

Besides the abovementioned challenge related to network compatibilities, group based MTC messaging through the current CBS would pose others challenges. References [1] and [2] have proposed letting the MTC-IWF to send group based trigger messages to the CBC to order to trigger a group of MTC devices by using the existing CBS mechanism. However, in evolved packet system (EPS), cell broadcasting is currently used by Public Warning System (PWS) solely for broadcasting warning messages via Evolved UMTS Terrestrial Radio Access (EUTRAN). A detailed description of warning message deliveries would be further described in reference [2] sections 9.1.3 and corresponding sub-sections. This would mean that every group based trigger message would be regarded as a warning message delivery for an emergency notification to UEs, and each notification would avoidably be regarded by the UEs as having the highest priority. However, legacy UEs may not recognize trigger messages sent by the CBS mechanism and would always have to receive the PWS message and then discard it and the received PWS messages would contain a Message Identifier which is not in the search list. Thus, needless power consumptions would be levied upon legacy UEs.

Also, in response to receiving a group based trigger message, a large number of MTC devices may respond to the group based trigger message at once and would therefore cause congestions in the Radio Access Network (RAN) nodes or Core (CN) nodes.

Furthermore, when MTC device triggering messages are applied through CBS or for group based trigger delivery, the MTC-IWF would first need to send trigger information to the CBC. However after submitting a trigger message to the CBC, the message delivery procedure between GSM/UMTS and EUTRAN are different as shown in FIG. 4b of section 9.1.3.2 and FIG. 9.1.3..3.2-1 of section 9.1.3.3.2. Thus, a solution would be needed in order to alleviate the resulting management complexity on the MTC-IWF so as to discern procedural differences between delivering trigger messages through GSM/UMTS or EUTRAN.

In order to tackle all these aforementioned challenges, a different method and apparatuses to handle group based MTC messaging would be use to meet these challenges.

SUMMARY OF THE DISCLOSURE

Accordingly, the present disclosure is directed to a UE, a base stat, and a MTC-IWF for implementing group based MTC messaging through cell broadcasting messages.

Accordingly, the present disclosure is directed to a MTC-IWF which receives a group trigger message from a MTC server. The group trigger message could be embedded in a Device Trigger Request message sent by the MTC server through the Tsp interface. The content of the group trigger message may include but not limited to a group identification of message targets, geographic information of message targets, and group message information. Since the group trigger message would be delivered using the CBS, the MTC-IWF could then format the group MTC message such that the message would differentiate from a typical warning message before delivering to a CBC the formatted the group trigger message embedded in the Device Trigger Request message.

According to one exemplary embodiment, a new warning type, such as a 'trigger' warning type could be used as a group trigger indicator in a warning message to differentiate between the group trigger message and a typical warning message. The 'trigger' warning type could be represented by one bit in the trigger payload, which is an information element of the group trigger message.

According to one exemplary embodiment, the new warning type, 'trigger' warning type could be served as a group trigger indicator embedded in the trigger payload which could be set or added by the MTC-IWF or by a service capability server (SCS) to be included in the group trigger message sent to the CBC. The group trigger indicator would inform a network control node or the CBC that the message received from the MTC-IWF is a group trigger message, and the 'trigger' warning type would indicate a serving base station to transmit a paging message which would include the trigger payload.

According to one exemplary embodiment, the group trigger message sent from a MTC server may include an information element which contains a randomized time window to randomize the response time from each UE so that each UE may respond according to a randomized delay. The group trigger message sent from the MTC server may also include a mobile originated (MO) transmission duration IE which randomizes the MO transmission initiation time within the MO transmission duration for initiating service request or attach procedures. Also the MTC-IWF may override the time window or the MO transmission duration in group trigger message received over the Tsp interface.

According to one exemplary embodiment, the MTC-IWF may add a cell broadcast message ID to the group trigger message for the purpose of identifying a group of MTC targets. The cell broadcast message ID could further include a group ID information to further distinguish among MTC targets in the case when multiple MTC groups use the same message ID.

Accordingly, the present disclosure is directed to a base station which receives from a CBC a WRITE-REPLACE message which contains a message content to be delivered to a group of devices, and the message content would include a parameter indicating that the message content is a group trigger message.

According to one exemplary embodiment, a base station would receive from the CBC in the WRITE-REPLACE message a group trigger message warning type or a 'trigger' warning type in the message content to distinguish from a normal warning type such as an earthquake warning type, a tsunami type, an earthquake and tsunami warning type, a test warning type, and an other warning type.

According to one exemplary embodiment, a base station would receive from the CBC in the WRITE-REPLACE message a group trigger message which would contain a message ID in its information element. The message ID would map to a group ID which would identify MTC devices as a group. The message content may further include a group ID to further identify MTC devices as a group.

According to one exemplary embodiment, in response to receiving a group trigger message from a CBC, the base station would broadcast the group message content through a broadcast channel. In particular, the broadcasting group message content would include a new SystemInformation-Blocktype would be used in addition to existing System Information Blocks (SIB) such as 1~13, and the SystemInformationBlocktype would contains parameters including but not limited to a group identifier, a message identifier, a serial number, a priority indicator, a MO transmission flag. The SystemInformationBlocktype may further contain a access barring parameter which would randomize the response time of receiving UEs from the MTC group.

In addition, the base station would use paging messages through a paging channel to page a group of MTC devices to alert the devices to receive broadcast messages. The paging messages may include a group trigger message indicator or 'trigger' warning type which would points to a SystemInformationBlocktype and would differ from ETWS or CMAS indicator. The SystemInformationBlocktype would contain the group trigger message. The indicator transmitted through paging would cause a UE to listen to the proper broadcast channel to obtain the group trigger message.

Otherwise, the base station may include in the paging messages a novel warning type or a group trigger message warning which differs from the aforementioned earthquakes and tsunami warning types, and the MTC group message warning type would cause a UE to listen to the proper broadcast channel to obtain the MTC group message.

Accordingly, the present disclosure is directed to an user equipment which is configured to receive a group trigger message indicator or a 'trigger' warning type from a paging message. The user equipment would then be directed to the group trigger message from the system information messages from the broadcast channel.

In order to make the aforementioned features and advantages of the present disclosure comprehensible, embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

In all the drawings of the present disclosure, a box enclosed by dotted lines would mean an optional functional element or an optional step, and a dotted line may mean that the process flow could be optional or may not necessarily occur.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

Cell broadcast can be used as a solution to trigger or send a message to a group of MTC devices when the geographic area in which the devices are located is known, and/or for use cases where only the subset of devices of an MTC group have to be triggered that are located in a particular geographic area. With this solution, group messages may be broadcast based on a Cell Broadcast Service (CBS)/Public Warning System (PWS) type solution as specified in TS 23.041.

Currently the existing CBS mechanism does not distinguish a device trigger message from a warning messages, and thus sending a device trigger message through an existing warning message and delivery procedure would induce unnecessary power consumption on legacy UEs. Also when sending device trigger messages to one or more large groups of MTC devices at once, the response signals from individual MTC devices could potentially overwhelm control nodes in the Radio Access Network (RAN) or control nodes in the Core Network (CN). Also sending a device trigger message across different networks having different delivery procedures could worsen the management complexity of the MTC-IWF.

Therefore, the present disclosure proposes a method and apparatuses of delivering a device trigger message towards a group of MTC devices, as known as a group trigger message, through a Cell Broadcasting Service (CBS). The method includes a MTC (Machine Type Communication) server transmitting to a MTC Inter-working Function (MTC-IWF) of a network a Device Trigger Request message containing group trigger information and a trigger payload. The trigger payload contains information for target triggering UE and is transparent to the network nodes, e.g. MTC-IWF, CBC, Core network nodes, and RAN nodes. The group trigger information contains parameters for the delivery of the device trigger message by the network, e.g. group identifier for identifying a group of MTC devices being a configured group, geographical areas, e.g. a cell or a group of cells, a tracking area, etc., where the target triggering UEs may be located, etc. In response to receiving device trigger message for group triggering, a network control node would page a group of UEs according to the group identifier and/or geographical areas. Each paged UE in a specific geographical area would be able to receive a group message through broadcast information. A legacy UE which does not support MTC device triggering would ignore a received group message embedded in a SIB for ETWS/CMAS if it does not recognize the received warning message used for group trigger message or would not understand the group message indicator and thus would not attempt to obtain the group message embedded in a corresponding System Information Block (SIB). Also the CBC would send a response message such as a broadcast response message to the MTC-IWF after receiving a WRITE-REPLACE Response message from MME or RNC to indicate a successful delivery of the broadcast request message, and thus the management complexity of the MTC-IWF would be reduced since the MTC-IWF does not have to distinguish group trigger deliveries between GSM/UMTS and EUTRAN.

Figure 1:
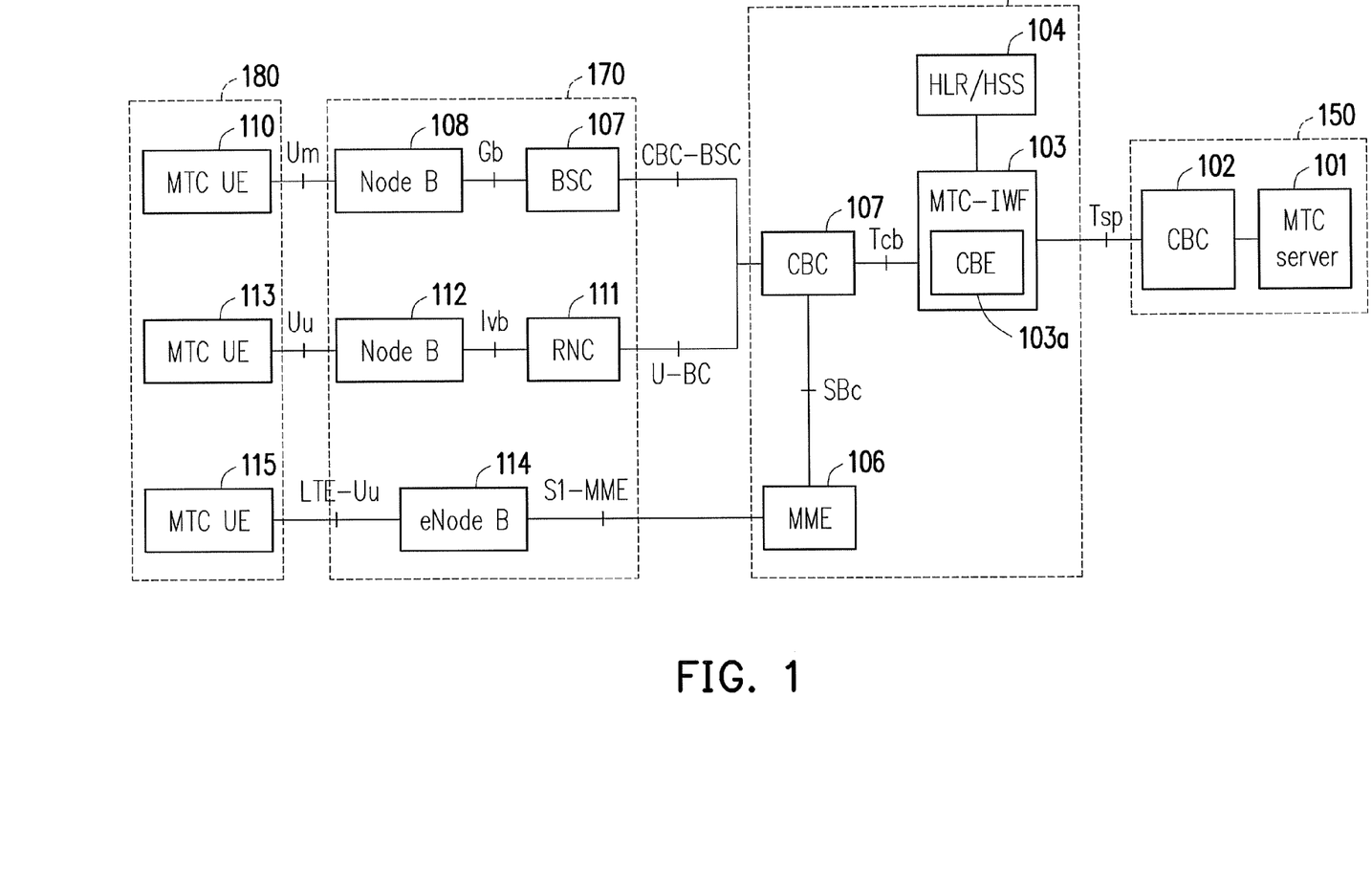
FIG. 1 illustrates an exemplary system architecture for group based messaging through Cell Broadcast Service (CBS) or Public Warning System (PWS).

FIG. 1 illustrates an exemplary system architecture for group based messaging through Cell Broadcast Service (CBS) or Public Warning System (PWS) to different types of networks. It should be noted that the deployment scenario in FIG. 1 is merely exemplary as FIG. 1 serves to illustrate the present disclosure, and hence for brevity purposes, FIG. 1 has omitted other network elements which are either less pertinent to the present disclosure or are actually pertinent but very well known in the art. For the sake of easier understanding, the overall system architecture would be demarcated into a Servers section 150, a Core Network (CN) section 160, a Radio Access Network (RAN) section 170, and user equipments (UEs) section 180. The Servers section 150 may include one or more MTC Application servers 101 connected to a service capability server (SCS) 102 via certain Application Programming Interfaces (API). The SCS 102 is also known as a MTC server which is usually under the domain of an internet service provider (ISP) or under the service domain of a mobile network operator (MNO) and provides an extremely wide variety of MTC services for MTC user equipments (MTC UEs). Specifically, the SCS 102 can send a device trigger message over Tsp to the CN section 160 for delivering the device trigger message towards an UE.

The term "user equipment" (UE) or "MTC UE" or "MTC device" in this disclosure represents embodiments that may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so forth. In some applications, a UE may be a fixed computer device operating in a mobile environment, such as a bus, train, an airplane, a boat, a car, and so forth. A UE or MTC UE or MTC device could be referred to any of the aforementioned embodiments which do not necessarily need human interactions.

For the present disclosure, the SCS 102 would deliver a Device trigger message as a group trigger message over the Tsp interface to the CN 160. The delivery of a group trigger message through the CBS mechanism is handled in the CN 160 by the MTC-IWF 103 which in general is a logical construct representing MTC features or functions supported by each MNO or CN. An MTC-IWF could also represent a network interface of MNO and supplies a plurality of protocols for communications between the CN and elements connected to the CN and also could represent a network interface of the CN to interconnect and intercommunicate between network elements (e.g., HSS, SGSN, SMS-SC, PDN-GW, etc.) within the CN.

The MTC-IWF 103 would include a CBE 103a, and this means that the MTC-IWF 103 would perform functions normally implement by a CBE such as formatting a received message into a message which is compatible with a CBC.

The MTC-IWF 103 is connected to a Home Subscriber Server (HSS) 104 or a Home Location Register (HLR) 104 which mostly stores subscriber information and is related to authentication of subscribers and servers. After receiving a device trigger message over the Tsp interface, also known as a group trigger message, for triggering a group of UEs, The MTC-IWF 103 would authenticate the group-based trigger service with the HSS/HLR 104 and delivery the group trigger message via an appropriate CBC 105 according to the geographic location of the target MTC devices. The CBC 105 would then authenticate the group trigger message request, identify the RAN control nodes to be contacted, and deliver the group trigger message to the identified RAN control nodes.

In the case of Long Term Evolution (LTE) communication systems, the CBC 107 would deliver the group trigger message to a Mobility Management Entity (MME) 106 which would deliver the group trigger message across the S1-MME interface to the eNB 114 and then to the MTC UEs 180. In the case of Global System for Mobile Communications (GSM), the CBC 107 would deliver the group trigger message across the CBC-BSC interface to the base station controller (BSC) 107 and then to the Node B 108 and then to the MTC UE 110 in the RAN 170. In the case of Universal Mobile Telephone Communication Systems (UMTS), the CBC 107 would deliver the group trigger message across to U-BC interface to the radio network controller (RNC) 111 and then to the Node B 112 and then to the MTC UE 113.

Since for an MTC-IWF in evolved packet system (EPS) in general, only Public Warning System (PWS) such as Earthquake Tsunami Warning System (ETWS) or Commercial Mobile Alert System (CMAS) is supported for cell broadcasting warning message via EUTRAN. This means that currently every device trigger message or group trigger message sent by the way of the CBS mechanism will be regarded as a warning message delivery for emergency notifications to the UEs. Thus, the system would offer the highest priority for such notification. In order to allow the CBC or another network control node in RAN 170 or CN 160 to handle a group trigger message differently from a warning message, the CBC or another network control node would need to have a way to be able to differentiate between a warning message and a group message.

Therefore present disclosure proposes using a new indicator, a MTC group message indicator or 'a group trigger' indicator, for identifying a message as a group trigger message used for delivering a device trigger message to a group of targeting MTC devices. And the group trigger message indicator could be represented by one or more bit values, a specific bit sequence or an integer value located in an information element (IE) in group trigger message, but does not exist in the current CBS mechanism. The MTC group message indicator would be included in the group trigger message for delivery from MTC-IWF 103 to the CBC 107. It is noticeable that the indicator would be added in the device trigger message by the SCS 102 and sent from the SCS 102 to the CN 160 across the Tsp interface, by the MTC-IWF 103 and sent from MTC-IWF 103 to the CBC 107, or by the MTC-IWF 103 if received from the HSS 104 in responding to the interrogation of the routing information.

The group trigger message including group trigger indicator will distinguish itself from a message using for general CBS, or a warning message using PWS for EWTS or CMAS. The device trigger message including the group trigger indicator would be delivered by the CN 160 and RAN 170 using an existing CBS/PWS mechanism. For PWS mechanism in LTE, when a UE receives a paging message indicated for ETWS/CMAS, the UE would listen to the proper broadcast channel to obtain the group trigger message from a system information block.

The group trigger indicator could be implemented using a new 'trigger' warning type, which is different from existing earthquakes and tsunami warning types, to distinguish from normal warning messages in PWS for EWTS or CMAS. The PWS has currently configured with several warning types which will be referred to as normal warning types. The existing warning types are an Earthquake warning type, a Tsunami warning type, an Earthquake and Tsunami warning type, a test warning type, and an other warning type. The 'trigger' warning type would be a new warning type and would distinguish itself from the aforementioned warning type. When a network control node in the CN 160 or in the RAN 170 receives the new warning type, the network control node would know that the message being received or delivered is a group trigger message and is not an existing warning type. When a UE receives a paging message with a group trigger indicator IE, which can be a new type or a bit to differentiate from the warning indicator of ETWS/CMAS, the UE would listen to the proper broadcast channel to obtain the group trigger message from a system information block.

In an exemplary embodiment, a priority indicator could be implemented to indicate a priority for a group trigger message and/or to a normal warning message. The priority indicator would contain a value indicating the priority level of the group trigger message and would thus assist the UE to prioritize the handling of received trigger/warning message received from the broadcasting system information. The normal warning message would be configured with the highest priority.

In an exemplary embodiment, a message identification (ID) could be used and associated with a MTC group message. All message ID(s) that is used for the group messaging purpose would need to be known and used by the network control nodes including the CBC, the MME, and the RAN 170 control nodes to identify the group trigger message. When the message ID is received by a network control node, the network control node would map the message ID to a group ID and knows that a message is a MTC group message and belongs to particular group of devices. In the case that multiple groups share the same message ID, an additional group ID information could be added to further distinguish among between groups of MTC devices. In this way, the UE receiving MTC group message via CBS/PWS may determine whether to ignore a particular cell broadcast message based on the specificity of the message ID. Further, a serial number could be added and associated to a specific message ID, which identifies whether the same device trigger message is being broadcasted. Since a same message could be repeatedly broadcasted for a specified duration, the serial number could distinguish one device trigger message from another.

The use of cell broadcasts for group messaging could potentially cause a flood of signalling when a high amount of devices responds to a cell broadcast group message nearly at the same time. The sudden flood of signallings may cause network congestions for both the CN 106 and the RAN 170. In order to spread the responses of triggered MTC devices at nearly the same time, the group trigger message may further contains IEs including a MO transmission flag and/or a MO transmission time duration for target UEs. The content of the MO transmission flag and/or MO transmission time duration may be set or modified by the SCS 102, MTC-IWF 103, CBC 107, MME 106, or RAN node 170. The MO transmission flag would indicate that if the target MTC devices need to initiate a Mobile originated (MO) transmission in response to the received device trigger message and the UE randomizes the MO transmission locally. If the MO transmission time duration is also provided, it can be used by the target UEs to randomize the MO transmission initiation time within mobile originated transmission duration for initiating a service request or attachment procedure to the RAN 170. In this way, the network congestions could be mitigated by spreading responses of MTC UEs over time according to a randomized distribution.

Also to solve the flooding signaling caused by responding MO transmission from the triggering MTC devices, the device trigger message may contains IEs an access barring parameter such as ac-BarringTime, ac-Barring Factor, ac-BarringForMO-Signalling, or ac-Barring ForMO-data, and etc. . . . . For example, assuming that the SCS has allocated the access barring parameter ac-BarringTime in the IE randomized response time window 307. In response to receiving a device trigger message, a UE would draw a random number or 'rand' which is uniformly distributed in the range 0≤rand≤1, the UE would then start the timer 'Tbarring' during which the UE may not transmit a response signal to the RAN 170. The Tbarring for example could be calculated according to Tbarring=(x+y*rand)*ac-BarringTime, where x and y could be 0.7 and 0.6 respectively or other configurable values. In this way, the network overload in RAN 170 or CN 160 could be avoided since the responses of MTC UEs would be spread out over time according to a randomized distribution.

Figure 2:
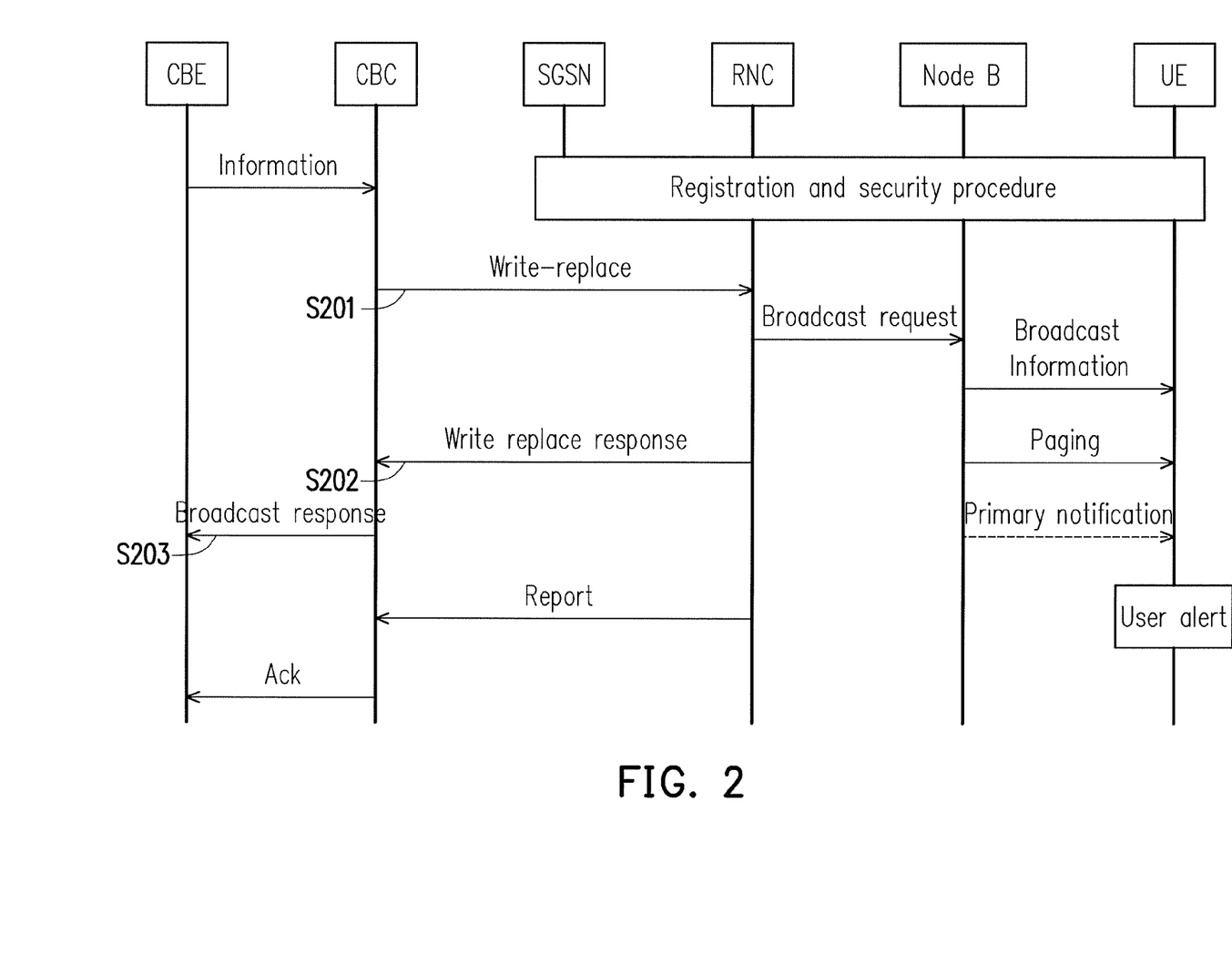
FIG. 2 illustrates a trigger message delivery procedure in GSM and UMTS in accordance with one of the exemplary embodiments of the present disclosure.
Figure 3:
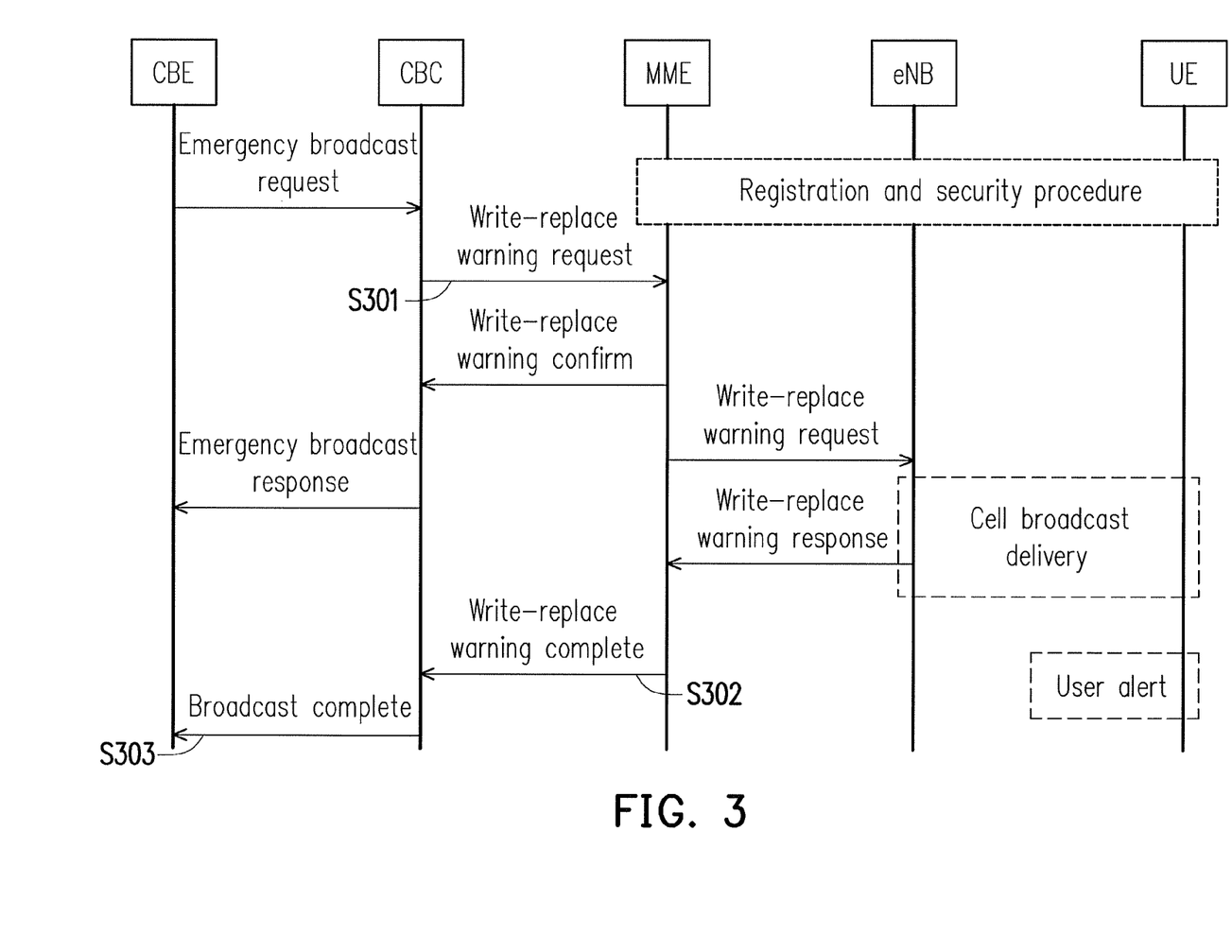
FIG. 3 illustrates a trigger message delivery procedure in EUTRAN in accordance with one of the exemplary embodiments of the present disclosure.

FIG. 2 & FIG. 3 illustrates trigger message delivery procedures from CBE 103a within MTC-IWF 103 to a CBC 105 and to two different types of RANs 170. The CBC 105 would be required to be modified from the existing standard to recognize a group trigger or message requests based on a new indicator, such as a MTC group message indicator, or a new message type, such as a "trigger" message type in order to differentiate from a normal PWS warning message. Also CBC 105 would be modified to allow different partners of a shared network to share the same CBC 105.

FIG. 2 illustrates a trigger message delivery procedure over GSM and UMTS type of RAN in accordance with one of the exemplary embodiments of the present disclosure. It should be noted that the current proposed procedure contains modifications from the existing procedure, and for brevity purposes the existing procedures will not be described in detail. In step S201, the CBC 107 would identify all target RNCs and in this example has identified that the RNC 111 serves at least one of the target UEs and subsequently delivers a WRITE-REPLACE message containing the group trigger message to the RNC 111. From the IE of the group trigger message, the RNC 111 would recognize that the received WRITE-REPLACE Warning message is for broadcasting a group MTC message rather than a normal warning message from the aforementioned group trigger indicator or MTC group message indicator.

Other procedures which is different from the existing procedure are step S202 and S203. In step S202, after transmitting the broadcast request message, the RNC 111 would transmit to the CBC 107 a WRITE-REPLACE response message, and also in step S203, the CBC 107 would transmit to the CBE 103a a Broadcast Response message in response to the WRITE-REPLACE response message. The purpose of the WRITE-REPLACE response message and the Broadcast Response message is to not only indicate successful delivery of the broadcast request message but also to allow the MTC-IWF 103 or CBE 601 to know that the response message being received in steps S619 and S620 is from a GSM/UMTS network. This reduces the complexity of the MTC-IWF 103 since the MTC-IWF does not have to distinguish group trigger deliveries between GSM/UMTS and EUTRAN.

FIG. 3 illustrates a trigger message delivery procedure in EUTRAN in accordance with one of the exemplary embodiments of the present disclosure. In step S301, the CBC 107 would transmit a WRITE-REPLACE Warning Request message to the a target MME such as MME 106, and the WRITE-REPLACE Warning Request message may contain the group trigger message and the group trigger indicator similar to GSM/UMTS network of FIG. 2. Also similar to the GSM/UMTS network as previously mentioned, the eNB 114 would recognize a group trigger indicator from the WRITE-REPLACE Warning Request, and subsequently would treat the warning message embedded in the WRITE-REPLACE Warning Request as a MTC trigger message and hence the group trigger indicator would prompt the eNB 114 to broadcast the group trigger message instead of a warning message.

Also similar to the GSM/UMTS network of FIG. 2, FIG. 3 also differs from the existing UTRAN network in steps S302 and S303. In step S302, the MME 106 would transmit a WRITE-REPLACE Complete Message to the CBC 107 to indicate the completion of the trigger delivery in response to receiving the WRITE-REPLACE WARNING Response message from eNB 114 in step S303. The WRITE-REPLACE WARNING Complete in step S302 and the Broadcast Complete in S303 would reduce the complexity of MTC-IWF 103 since the MTC-IWF 103 would not have to distinguish between a GSM/UMTS network and a UTRAN network.

Upon receiving a group trigger message included in the message of CBS/PWS from RNC in CBS or MME in PWS, the NodeB or eNB would transmit a paging message to UEs served by the NodeB/eNB, and the paging message would subsequently prompt UEs to listen to the broadcast messages. Further the NodeB or eNB would compose the broadcast message by including IEs obtaining from the received device trigger message.

In an exemplary embodiment, the eNB sends the paging message indicating a ETWS or a CMAS indicator and would include a MTC group message indicator or a 'trigger' warning type in a SystemInformationBlockType for ETWS/CMAS. Upon receiving the ETWS/CMAS indicator, the UE would identify the SIBtype as a MTC group message within a SystemInformationBlockType based on the MTC group message indicator or a trigger warning type, or a Message ID, or a priority indicator using for MTC group message. In order words, the SystemInformationBlockType would still be any of SIB10~12 reserved for ETWS/CMAS and the SystemInformationBlockType would contain IEs including the MTC group message indicator, or a message ID with specific values for MTC group, or a message type with specific value reserved for MTC group message, or a priority indicator with value reserved for MTC group. In the meantime, a MO transmission flag, a MO transmission duration, access barring parameters as well as trigger payload may be additionally included in the existing SystemInformationBlockType reserved for ETWS/CMAS.

In an exemplary embodiment, the paging message sending from eNB would contain the 'trigger' indicator which differs from a ETWS or a CMAS indicator for the ETWS/CMAS. Upon receiving the paging message indicating a trigger indicator, the UE would locate the SystemInformationBlockType which has not been assigned at this point in time and receive the MTC group message within the SystemInformationBlockType. For example, the SystemInformationBlockType would not be any of SIB1~12 and could be a SIB13, SIB 14, or SIB15 which is not limited by the present disclosure. The new SystemInformationBlockType would contain IEs including the a group ID, a message ID, a serial number of the broadcasted system information message, a priority indicator, a MO transmission flag, a MO originated transmission duration, an access barring parameter, and trigger payload.

Figure 4:
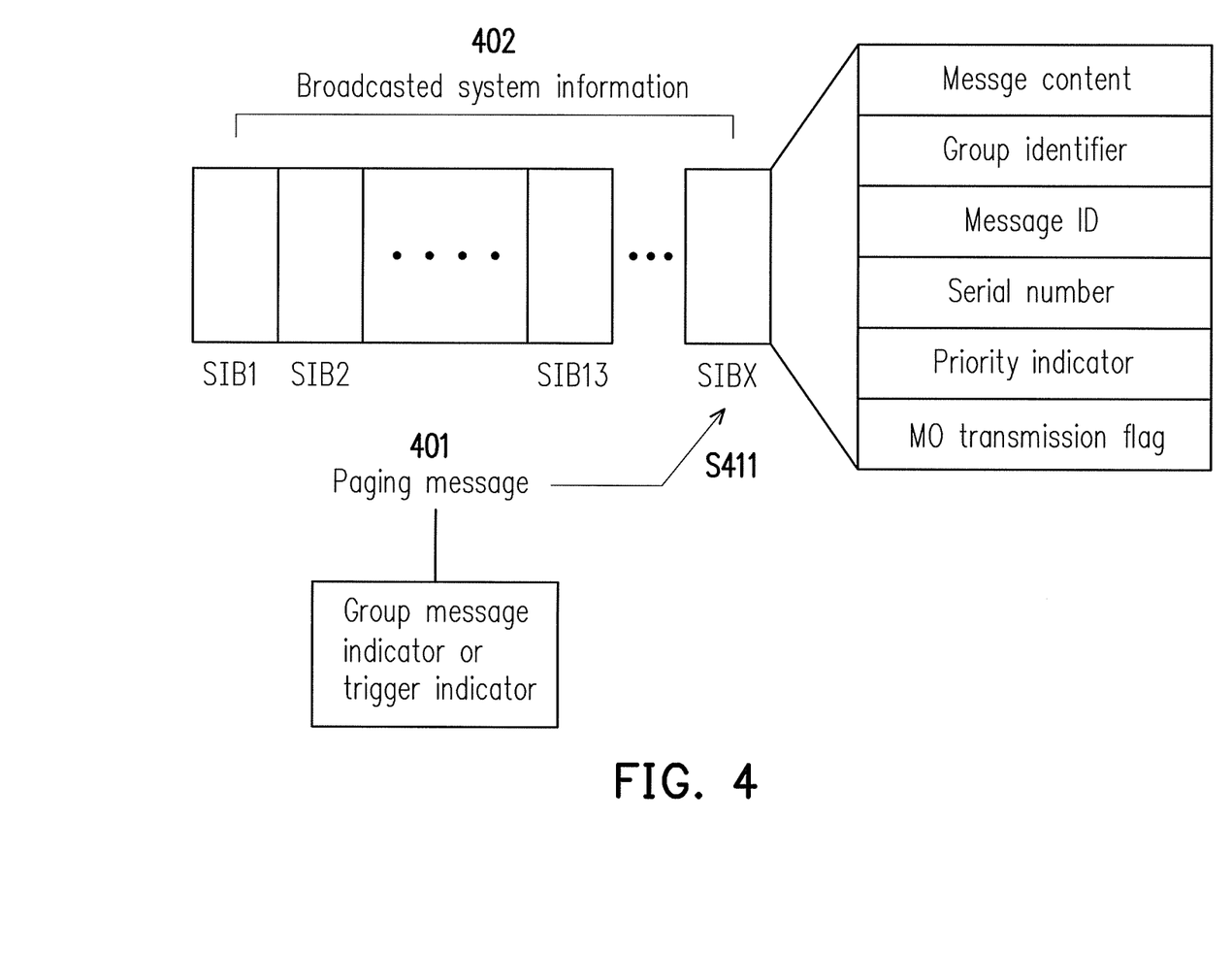
FIG. 4 illustrates a system information block contain MTC group message parameters in accordance with one of the exemplary embodiments of the present disclosure.

FIG. 4 illustrates a UE handling a system information block contain group trigger message parameters in accordance with one of the exemplary embodiments of the present disclosure. In response to receiving a paging message 401, the targeted MTC UE could obtain a device trigger message from the broadcasting system information 402. According to one embodiment, in response to recognizing a group trigger indicator indicating group MTC message in a paging message 401, in step S411 the UE would obtain the device trigger message in a new SIB, SIBx. The new SIB would be a new SystemInformationBlockType as previously mentioned. However, the group ID could be associated with the group ID previously assigned by the MTC server 102 or MTC-IWF 103, and the group ID could specify a group of UEs that are members of a group to be triggered. Also with both of the message ID and the serial number, a UE could use both to detect the reception of message duplication to detect a specific message ID. The priority indicator could be used to classify the group trigger message based on priority also the MTC UE may use the priority to establish the subsequent RRC connection if needed. If the group trigger message is an actual warning message, the UE would have a higher priority to establish the subsequent RRC connection.

MTC devices that are configured to receive broadcast messages will need to: listen on the appropriate broadcast channel(s) for triggering messages; understand the message ID(s) that are to be used by the application; optionally, understand the group identification information in the cell broadcast message body perform the appropriate action after being triggered; MTC Devices need to have controlled access to avoid network overload spread out responses over time possibly according to information received in the message.

It should be noted that the indicator which indicates the nature of the device trigger message or the warning type such as the "trigger" warning type could be set by the MTC-IWF 103, the HSS/HLR 104, and the MTC server 101.

Furthermore, it has been determined that using the ETWS or CMAS indicator in paging message over LTE-Uu interface for delivering group message would induce higher power consumption on legacy UEs as a legacy UE being paged would always have to receive the SIB10~SIB12 associated with ETWS/CMAS warning message before discarding the received CMAS/ETWS messages if the message has a message ID which is not in UEs' search list. Consequently, more power consumption is then induced on the legacy UEs. However, if a new indicator pointing to a new SIB is adopted, legacy UEs would not require high power consumption since a legacy UE not being able to understand device triggering would not read the System Information.

Figure 5:
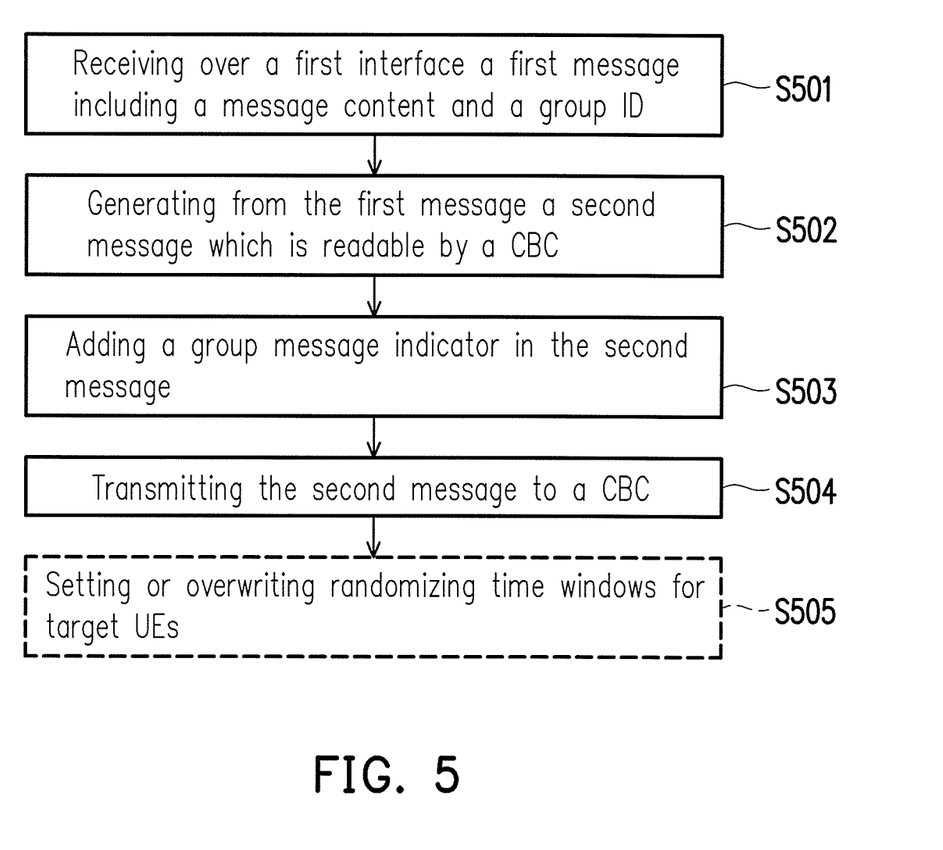
FIG. 5 illustrates a group messaging procedure from the perspective of a MTC-IWF in accordance with one of the exemplary embodiments of the present disclosure.

FIG. 5 illustrates a group messaging procedure from the perspective of a MTC-IWF in accordance with one of the exemplary embodiments of the present disclosure. In step S501, the MTC-IWF would receive over a first interface a first message which may include a message content and associated parameters such as a group ID. The first message could be embedded in the trigger payload of a Device Trigger Request message. The first interface could be a Tsp interface between a MTC server and the MTC-IWF. In step S502, the MTC-IWF may implement functions of a CBE and performs necessary conversions to convert the format of a first message into a format compatible with CBS and readable by a CBC to generate a second message. In step S503, the MTC-IWF would added a group message indicator in the second message. The indicator would indicates that the first message in the trigger payload is not a normal warning message but is a group MTC message. In step S504, the MTC-IWF would then transmit the second message to a CBC. In step S505, the MTC-IWF may optionally set or overwrite the randomizing time windows for target UEs in the second message.

Figure 6:
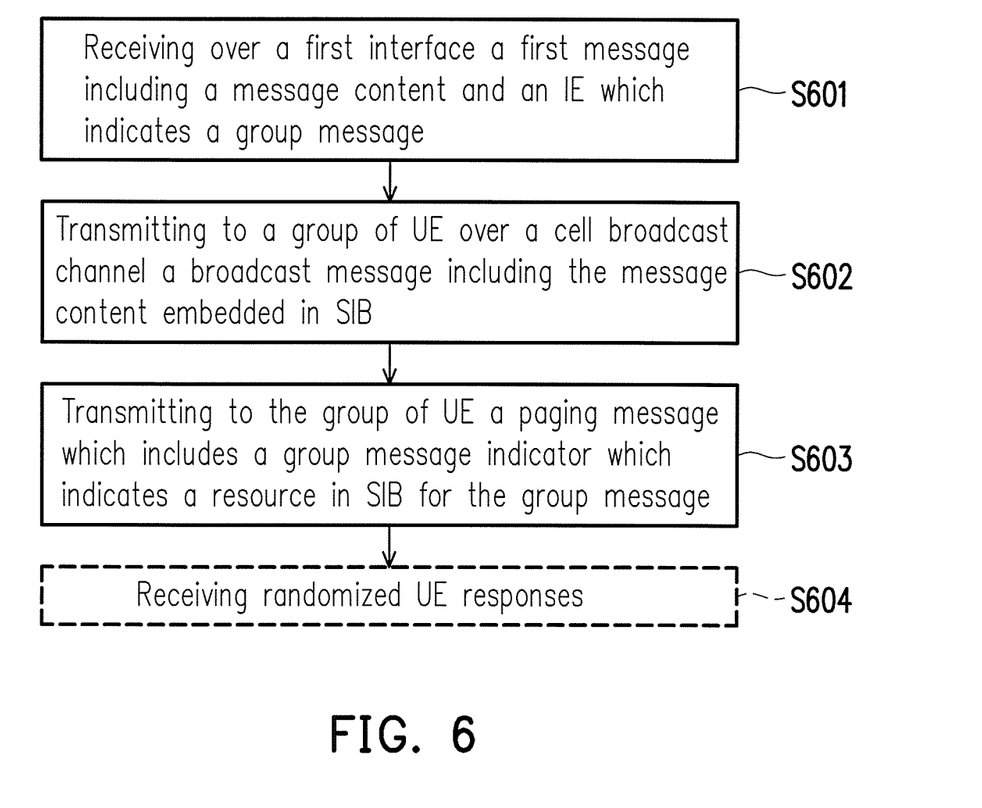
FIG. 6 illustrates a group messaging procedure from the perspective of a base station in accordance with one of the exemplary embodiments of the present disclosure.

FIG. 6 illustrates a group messaging procedure from the perspective of a base station in accordance with one of the exemplary embodiments of the present disclosure. In step S601, the base station would receive over a first interface a first message which would contains a message including an IE which indicates a group message. The first interface could be any one of a S1-MME interface, a CBC-BSC interface, or a U-BC interface. In step S602, the base station would transmit to a group of UE over a cell broad channel a broadcast message which would include the message content embedded in a system information block. In step S603, the base station would transmit to the group of UEs a paging message which includes a group message indicator indicating the existence of a group message in a resource in SIB of the broadcast message. The group indicator or 'trigger indicator' in the paging message would cause paged UEs to listen to the broadcast message and obtain the group message through a new SIB, which is not SIB1~SIB13. In step S604, the base station may optionally receive UE responses with randomized delays.

Figure 7:
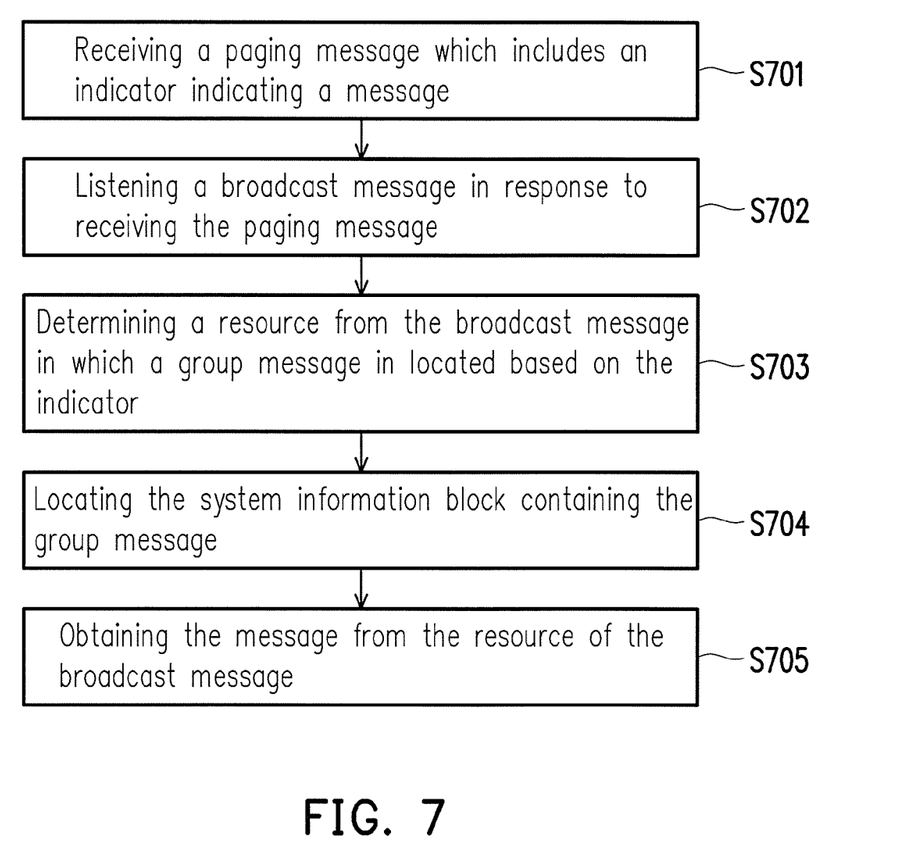
FIG. 7 illustrates a group messaging procedure from the perspective of a user equipment in accordance with one of the exemplary embodiments of the present disclosure.

FIG. 7 illustrates a group messaging procedure from the perspective of a user equipment in accordance with one of the exemplary embodiments of the present disclosure. In step S701, the UE would receive a paging message which includes an 'trigger' indicator indicating a message to be received. In step S702, in response to receiving the paging message, the UE would listen to a broadcast message over a cell broadcast channel. The indicator would indicate a resource for the message to be retrieved. In step S703, the UE would locate the correct resource from the broadcast message in which the message could be obtained based on the indicator. In step S704, the UE finds the correct SIB in which the group message in contained. In step S705, the UE obtains the broadcast message based on the message and associated parameters located in the SIB. The SIB would not be any one of SIB1~SIB 13.

Figure 8:
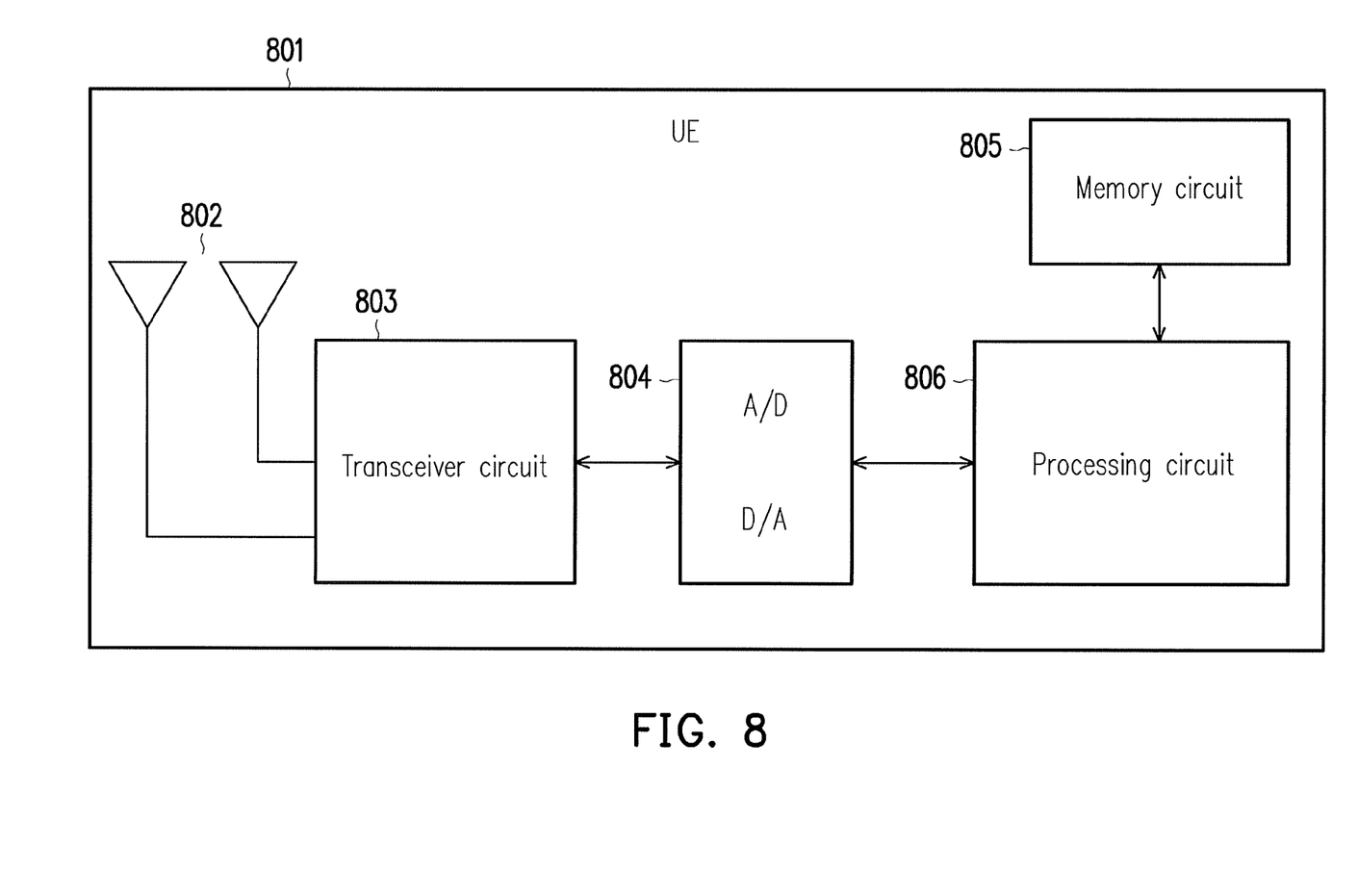
FIG. 8 illustrates the functional block diagram of a user equipment in accordance in accordance with one of the exemplary embodiments of the present disclosure.

FIG. 8 illustrates the functional block diagram of a UE in accordance in accordance with one of the exemplary embodiments of the present disclosure. Each UE 801 of the communication system may contain at least but not limited to a transceiver circuit 803, an analog-to-digital (A/D)/digital-to-analog (D/A) converter 804, a processing circuit 806, a memory circuit 805, and one or more antenna units 802. The transceiver circuit 803 would transmit downlink signals and receives uplink signals wirelessly. The transceiver circuit 803 may also perform operations such as low noise amplifying, impedance matching, frequency mixing, up or down frequency conversion, filtering, amplifying, and so like. The analog-to-digital (A/D)/digital-to-analog (D/A) converter 804 is configured to convert from an analog signal format to a digital signal format during uplink signal processing and from a digital signal format to an analog signal format during downlink signal processing.

The processing circuit 806 would be configured to process digital signal and to perform procedures of the proposed method in accordance with exemplary embodiments of the present disclosure. Also, the processing circuit 806 would be electrically coupled to a memory circuit 805 which stores programming codes, codebook configurations, buffered data, or record configurations assigned by the processing circuit 806. The functions of the processing circuit 806 could be implemented using programmable units such as a microprocessor, a micro-controller, a DSP chips, FPGA, etc. The functions of the processing circuit 806 may also be implemented with separate electronic devices or ICs.

In view of the aforementioned descriptions, the present disclosure is able to trigger groups of MTC devices by using an existing network infrastructure, reduce power consumption on legacy UEs, reduce network congestions in the RAN network control nodes or CN control nodes, and reduce the management complexity of the MTC-IWF when facing different network delivery procedures.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A user equipment (UE) configured to receive a group trigger message which is sent to a group of Machine Type Communication (MTC) devices comprising the UE based on a Cell Broadcast Service (CBS) messaging system, the UE comprising:

a receiver; and a processing circuit coupled to the receiver, wherein the processing circuit is configured to:

receive via the receiver a paging message comprising an indicator indicating a group trigger message to be received;

receive via the receiver a broadcast message in response to receiving the paging message;

determine a resource from the broadcast message in which the group trigger message is obtained;

obtain the group trigger message from the resource of the broadcast message, wherein the resource is determined from a system information block (SIB) of the broadcast message in response to receiving the indicator, the resource is in the SIB which is other than SIB x, and x is an integer only from 1 to 13 and the SIB comprises an access barring parameter which randomizes a response time for each of the group of MTC devices to respond according to a randomized delay.

2. The UE of claim 1, wherein the SIB further comprises at least one of a group identifier (ID), a message ID, a serial number of the broadcast message, a priority indicator of the message, a mobile originated (MO) transmission flag, and a trigger payload.

3. The UE of claim 1, wherein the indicator comprises an information element which indicates a type which is other than a warning type.

4. The UE of claim 2, wherein the SIB further comprises a MO transmission duration which randomizes a response time for each of group of MTC devices to initiate a service request or an attach procedure.

5. The UE of claim 1 further comprising a non-transitory storage medium which stores computer readable instructions capable of being loaded into the processing circuit to execute the functions of claim 1.

6. A base station configured to transmit a group trigger message to a group of Machine Type Communication (MTC) devices based on a Cell Broadcast Service (CBS) messaging system, the base station comprising:

a receiver;

a transmitter; and a processing circuit coupled to the receiver and the transmitter, wherein the processing circuit is configured to:

receive via the receiver over a first interface a first message comprising an information element (IE) which indicates that the first message is intended for a group of MTC devices;

transmit via the transmitter a paging message comprising a group trigger message indicator for the first message; and transmit via the transmitter to the group of MTC devices over a cell broadcast channel a broadcast message comprising the first message which is embedded in a system information block (SIB) of the broadcast message, wherein the SIB is other than SIB x, and x is an integer only from 1 to 13 wherein the SIB comprises an access barring parameter which randomizes a response time for each of the group of MTC devices to respond according to a randomized delay.

7. The base station of claim 6, wherein the first message is one of a Broadcast Request message and a Write-Replace Warning Request message.

8. The base station of claim 7, wherein in response to receiving via the receiver the first message, the base station obtains from the IE of the first message a value which indicates the first message is intended for the group of MTC devices.

9. The base station of claim 7, wherein in response to receiving via the receiver the first message, the base station obtains from the IE of the first message a type which indicates the first message is intended for the group of MTC devices and differs from the warning message.

10. The base station of claim 6, wherein the group trigger message indicator points to the SIB which is different from the another SIB reserved for the warning message.

11. The base station of claim 10, wherein the SIB further comprises at least one of a group identifier (ID), a message ID, a serial number of the broadcast message, a priority indicator, a mobile originated (MO) transmission flag, and a trigger payload.

12. The base station of claim 6 wherein the IE is set by any of a Machine Type Communication Inter-working Function (MTC-IWF), a Home Subscriber Server (HSS), and a MTC server.

13. The base station of claim 6, wherein the IE comprises a MO transmission duration which is for each terminal target to randomize response time within the MO transmission duration to initiate a service request or an attach procedure.

* * * * *